(12) United States Patent
Lee

(10) Patent No.: US 10,858,743 B2
(45) Date of Patent: Dec. 8, 2020

(54) HYDROGEN WATER DISPENSER UNIT AND REFRIGERATOR HAVING SAME

(71) Applicant: Daewoo Electronics Co., Ltd., Gwangju (KR)

(72) Inventor: Wang-Koo Lee, Incheon (KR)

(73) Assignee: DAEWOO ELECTRONICS CO., LTD., Gwangju (KR)

( * ) Notice: Subject to any disclaimer, the term of this patent is extended or adjusted under 35 U.S.C. 154(b) by 0 days.

(21) Appl. No.: 16/234,132

(22) Filed: Dec. 27, 2018

(65) Prior Publication Data

US 2019/0368055 A1 Dec. 5, 2019

(51) Int. Cl.
| C25B 1/04 | (2006.01) |
| C25B 9/06 | (2006.01) |
| F25D 23/02 | (2006.01) |
| C25B 15/08 | (2006.01) |
| F25D 23/12 | (2006.01) |
| C25B 15/02 | (2006.01) |

(52) U.S. Cl.
CPC .................. *C25B 1/04* (2013.01); *C25B 9/06* (2013.01); *C25B 15/02* (2013.01); *C25B 15/08* (2013.01); *F25D 23/028* (2013.01); *F25D 23/126* (2013.01)

(58) Field of Classification Search
CPC ............ A63B 57/50; B65D 81/32; A01C 7/02
USPC ...................................................... 222/146.6
See application file for complete search history.

(56) References Cited

U.S. PATENT DOCUMENTS

| 2003/0196447 A1* | 10/2003 | Lee ........................... F25C 5/22 62/389 |
| 2006/0144075 A1* | 7/2006 | Bowen .................. F25D 23/126 62/344 |
| 2010/0082159 A1* | 4/2010 | Kim .......................... F25C 5/22 700/275 |
| 2011/0139304 A1* | 6/2011 | Chase ....................... F25C 5/20 141/331 |
| 2013/0043124 A1* | 2/2013 | Park ...................... C02F 1/4676 204/263 |
| 2014/0007609 A1* | 1/2014 | Lee ........................ F25D 23/126 62/389 |
| 2014/0124544 A1* | 5/2014 | Licht .................... B67D 1/0857 222/477 |
| 2015/0197863 A1* | 7/2015 | Kim .......................... C25B 1/04 204/230.5 |
| 2015/0232315 A1* | 8/2015 | Sanchez ............... B67D 1/0857 222/23 |
| 2015/0368816 A1* | 12/2015 | Iwai ....................... C25B 11/03 204/272 |
| 2016/0002075 A1* | 1/2016 | Iwai ..................... C02F 1/4676 204/242 |
| 2016/0025406 A1* | 1/2016 | An ........................ F25D 23/126 222/143 |
| 2016/0032467 A1* | 2/2016 | Kim .......................... C25B 9/08 204/263 |
| 2016/0059192 A1* | 3/2016 | Jeong ........................ F25C 5/22 99/323.2 |
| 2017/0166460 A1* | 6/2017 | Ito ....................... C02F 1/46109 |

* cited by examiner

*Primary Examiner* — Donnell A Long

(57) ABSTRACT

The embodiments of the present invention relate to a hydrogen water dispenser unit and a refrigerator having the same, in which a hydrogen water generator disposed inside the refrigerator provides hydrogen water, as well as normal water, according to user preference.

16 Claims, 11 Drawing Sheets

HYDROGEN WATER DISPENSER UNIT AND REFRIGERATOR HAVING SAME

CROSS REFERENCE TO RELATED APPLICATION

The present application claims priority to Korean Patent Application No. 10-2018-0060971, filed May 29, 2018, the entire contents of which is incorporated herein for all purposes by this reference.

BACKGROUND OF THE INVENTION

Field of the Invention

Embodiments of the present invention relate generally to a hydrogen water dispenser unit and a refrigerator having the same. More particularly, embodiments of the present invention relate to a hydrogen water dispenser unit and a refrigerator having the same, in which both hydrogen water as well as normal water are dispensed according to user preference.

Description of the Related Art

Recently, as hydrogen is known to effectively remove oxygen free radicals present in the human body, the demand for hydrogen water, which is hydrogen is dissolved in normal water, is increasing rapidly, and the market for hydrogen-water related items is growing explosively.

Hydroxyl radicals (OH), which result from respiration, are known to damage proteins, cell membranes, DNA, etc., that make up cells of the human body cells, thereby lowering overall immunity. Further, hydroxyl radicals that remain in the body are known to cause diabetes and hypertension as well as aging.

As is known, these hydroxyl radicals are converted into water ($H_2O$) when they are combined with hydrogen ($H_2$) ($2OH+H_2 \rightarrow H_2O$). That is, when drinking hydrogen water, the hydroxyl radicals accumulated in the body are converted into harmless water by being continuously supplied with hydrogen.

The refrigerator is an appliance that maintains food fresh by lowering the temperature of the refrigerating chamber and the interior of the refrigerator as a refrigerant repeats the refrigeration cycles of compressing, condensing, expanding, and evaporating. Further, many refrigerator models are provided with a dispenser unit, which allows a user to receive drinking water or ice therethrough. Here, the water provided through the dispenser unit is normal water, e.g., tap water, and no known refrigerator of the prior art has been developed so far, which generates hydrogen water and provides generated hydrogen water through a dispenser unit. As the demand for hydrogen water is increasing, there is a need for a refrigerator appliance that can supply hydrogen water through a dispenser unit.

Accordingly, embodiments of the present invention disclose a dispenser unit capable of providing hydrogen water that can remove hydroxyl radicals accumulated in the body and a refrigerator including the same.

The foregoing is intended merely to aid in the understanding of the background of the present invention, and is not intended to mean that the present invention falls within the purview of the related art that is already known to those skilled in the art.

SUMMARY OF THE INVENTION

Accordingly, embodiments of the present invention have been made keeping in mind the above problems occurring in the related art, and it is a first object to provide a hydrogen water dispenser unit and a refrigerator having the same, in which a hydrogen water generator is provided to separate the normal water flowing inside the dispenser unit into hydrogen and to dissolve the generated hydrogen in the normal water to produce hydrogen water for consumption.

Further, it is a second object to provide a hydrogen water dispenser unit and a refrigerator including the same, in which before normal water flows into the hydrogen water generator, the hydraulic pressure thereof is reduced to facilitate hydrogen generation in an electrode body located inside the hydrogen water generator.

Further, it is a third object to provide a hydrogen water dispenser unit and a refrigerator including the same, in which a hydrogen water generation controller is provided in one side of a front surface of the dispenser unit to control the operation of the hydrogen water generator via a button or touch input manner, thereby selectively supplying normal water and hydrogen water according to user preference.

Further, it is a fourth object to provide a hydrogen water dispenser unit and a refrigerator including the same, in which the hydrogen water generator is disposed at a front side of the guide unit at a location adjacent to the outlet portion, whereby it is possible to prevent the hydrogen dissolved in the water from decreasing over time.

Further, it is a fifth object to provide a hydrogen water dispenser unit and a refrigerator including the same, in which to prevent interference with the drive unit placed adjacent to the outer side of one of the side guide walls, the hydrogen water generator is placed adjacent to the outer side of a remaining side guide wall, whereby it is possible to reduce the size of the dispenser unit thereby increasing the convenience of the entire layout.

Further, it is a sixth object to provide a hydrogen water dispenser unit and a refrigerator including the same, in which when the hydraulic pressure is reduced below a predetermined level (by a pressure reducing portion used as an inlet portion of the hydrogen water generator which extends downward), it is possible to compensate the hydraulic pressure.

Further, it is a seventh object to provide a hydrogen water dispenser unit and a refrigerator including the same, in which a front part of the dispenser unit corresponding to the hydrogen water generator is made of a transparent material and the outer surface of the hydrogen water generator is also made of a transparent material, whereby the user can advantageously check the generation of hydrogen water in real time.

Further, it is a eighth object to provide a hydrogen water dispenser unit and a refrigerator including the same, in which an LED is additionally provided at a position adjacent to the hydrogen water generator to allow the occurrence of hydrogen water to be monitored even in a dark indoor space to improve refrigerator use.

Further, it is a ninth object to provide a hydrogen water dispenser unit and a refrigerator including the same, in which a display portion displays replacement information pertaining to the hydrogen water generator when an amount of hydrogen dissolved in the hydrogen water (supplied from the hydrogen water generator) is less than or equal to a predetermined value, whereby it is possible to replace the hydrogen water generator rapidly during abnormal operation.

Further, it is a tenth object to provide a hydrogen water dispenser unit and a refrigerator including the same, in which because an outlet portion-insertion hole penetrating through the outlet portion is disposed in front of the hollow portion through which ice is discharged, it is possible to use the dispenser unit regardless of the shape of the cup, thereby facilitating user convenience.

Further, it is a eleventh object to provide a hydrogen water dispenser unit and a refrigerator including the same, in which a hydrogen water supply path and a normal water supply path are separated such that the residual hydrogen in an outlet portion side is not dissolved in the normal water, whereby it is possible to selectively supply normal water and hydrogen water for consumption.

Further, it is a twelfth object to provide a hydrogen water dispenser unit and a refrigerator including the same, in which a normal water outlet portion extends substantially horizontally and then extends downwardly in accordance with a bend thereof, whereby it is possible to minimize the flow path of normal water.

Further, it is a thirteenth object to provide a hydrogen water dispenser unit and a refrigerator including the same, in which positions of the outlet portion-insertion hole and the normal water hole are adjacent to each other or outer circumferential surfaces thereof are substantially in linear contact with each other, thereby facilitating user convenience.

In order to accomplish the objects of the present invention as described above and to carry out the characteristic functions of the present invention described below, embodiments of the present invention are described as follows.

According to an embodiment of the present invention, a hydrogen water dispenser unit includes: a plate unit provided with a hollow portion; a guide unit extending upward along an upper surface of the plate unit, and including a front guide surface provided on a front side thereof and side guide walls respectively connected to opposite side ends of the front guide surface to surround the hollow portion; and a water supply unit including: an inlet portion configured to supply water to an inside of the dispenser unit; a hydrogen water generator provided with an electrode body therein to electrolyze the introduced water and generate hydrogen, and wherein the hydrogen water generator is configured to generate hydrogen water by dissolving the generated hydrogen in the water; and an outlet portion configured to discharge water supplied from the hydrogen water generator.

According to an embodiment of the present invention, the water supply unit provided in the hydrogen water dispenser unit further includes a pressure reducing portion disposed between the inlet portion and the hydrogen water generator to reduce a hydraulic pressure of normal water, e.g., introduced water, supplied from the inlet portion to the hydrogen water generator.

According to an embodiment of the present invention, the dispenser unit further includes a check unit including a hydrogen water generation controller provided at a side of a front surface of the dispenser unit and configured to be operated by a button or touch input manner to and configured to control operation of the hydrogen water generator.

According to an embodiment of the present invention, the hydrogen water generator provided in the hydrogen water dispenser unit is disposed at a side of a front surface of the guide unit and is adjacent to the outlet portion.

According to an embodiment of the present invention, the dispenser unit further includes: an ice cap rotatably coupled to the guide unit and configured to open and close the hollow portion; and a drive unit disposed adjacent to an outer side surface of one of the side guide walls and configured to provide a rotational force to the ice cap, wherein the hydrogen water generator is disposed adjacent to an outer side surface of the remaining side guide wall of the side guide walls.

According to an embodiment of the present invention, the hydrogen water generator provided in the hydrogen water dispenser unit includes: a supply portion extending downward to penetrate through an upper surface of the hydrogen water generator such that normal water flows therein; and a discharge portion formed through a side surface of the hydrogen water generator.

According to an embodiment of the present invention, the water supply unit provided in the hydrogen water dispenser unit further includes a flow portion configured such that a first end thereof extends horizontally from a second end of the pressure reducing portion, such that normal water is allowed to flow to the inlet portion.

According to an embodiment of the present invention, the dispenser unit further includes a check unit provided with a display portion configured such that on a front surface thereof, a part corresponding to the hydrogen water generator is made of a transparent material, and wherein an outer surface of the hydrogen water generator is also made of a transparent material.

According to an embodiment of the present invention, the dispenser unit further includes a lighting unit constituted by an LED lighting device and disposed adjacent to the hydrogen water generator.

According to an embodiment of the present invention, the display portion provided in the hydrogen water dispenser unit displays replacement information pertaining to the hydrogen water generator when an amount of hydrogen dissolved in the hydrogen water supplied from the hydrogen water generator is less than or equal to a predetermined value.

According to an embodiment of the present invention, the dispenser unit further includes a mount unit having an outlet portion-insertion hole to allow the outlet portion to be inserted therethrough to be adjacent to a front surface thereof, and wherein the outlet portion-insertion hole is disposed in front of the hollow portion.

According to an embodiment of the present invention, a hydrogen water dispenser unit includes: a plate unit provided with a hollow portion as a path for ice; a guide unit extending upward along an upper surface of the plate unit, and including a front guide surface provided on a front side thereof and side guide walls respectively connected to opposite side ends of the front guide surface to surround the hollow portion; and a water supply unit including: a hydrogen water generator configured to discharge hydrogen water to a space outside the dispenser unit, and provided with an electrode body therein to electrolyze the introduced water and generate hydrogen therefrom; an inlet portion configured to supply water inside the dispenser unit; a first outlet portion configured to discharge the hydrogen water discharged from the hydrogen water generator; a two-way valve provided at a side end of the inlet portion disposed at an outside the dispenser unit; and a second outlet portion configured such that normal water flows in a lateral direction of the two-way valve.

According to an embodiment of the present invention, the second outlet portion provided in the hydrogen water dispenser unit extends in the lateral direction of the two-way valve and then extends downward in accordance with a bend thereof.

According to an embodiment of the present invention, the dispenser unit further includes: an outlet portion-insertion hole configured to allow the first outlet portion to be inserted therethrough at a location adjacent to a first surface of the dispenser unit; and a through-hole configured to allow the second outlet portion to be inserted therethrough, wherein the outlet portion-insertion hole and the through-hole are provided at a mutually adjacent position or at a position where a part of an outer circumferential surface of the outlet portion-insertion hole is in linear contact with a part of an outer circumferential surface of the through-hole.

According to an embodiment of the present invention, the hydrogen water generator provided in the hydrogen water dispenser unit is disposed at a side of a front surface of the guide unit to be adjacent to the first outlet portion.

According to an embodiment of the present invention, the dispenser unit further includes a check unit including a hydrogen water generation controller provided at a side of a front surface of the dispenser unit and configured to be operated by a button or touch input manner to control operation of the hydrogen water generator, wherein the two-way valve selectively opens and closes inlets of the inlet portion and the second outlet portion according to an operation signal of the hydrogen water generation controller.

According to an embodiment of the present invention, a refrigerator includes: a storage body forming an entire appearance of the refrigerator and being configured such that an inner space thereof is recessed from a front side to a rear side; an opening and closing unit coupled to the storage body to selectively open and close the inner space; and the above described dispenser unit provided at a side of the refrigerator.

According to an embodiment of the present invention, the dispenser unit provided in the refrigerator further includes a water discharge operation unit configured to discharge hydrogen water or normal water outside the refrigerator, wherein the water discharge operation unit includes: a first pressing portion being disposed below the plate unit and extending downward; a first contact protrusion protrudingly formed and rotatably coupled to the first pressing portion; and a first switch disposed adjacent to the first contact protrusion such that the dispenser unit discharges water outside of the outlet portion under control of a control unit when the first contact protrusion is pivotally contacted.

According to the above-described configuration, the present invention has the following advantages.

An embodiment of the present invention is advantageous in that a hydrogen water generator is provided to separate the normal water flowing inside the dispenser unit into hydrogen and then dissolve the generated hydrogen in the normal water to provide hydrogen water for consumption.

An embodiment of the present invention is further advantageous in that before normal water flows into the hydrogen water generator, its hydraulic pressure is reduced to maximize the hydrogen generation process in the electrode body that is located inside the hydrogen water generator.

An embodiment of the present invention is further advantageous in that a hydrogen water generation controller is provided in one side of the front surface of the dispenser unit to control the operation of the hydrogen water generator via a button or touch input manner, thereby selectively supplying normal water and hydrogen water according to user preference.

An embodiment of the present invention is further advantageous in that the hydrogen water generator is disposed at the front side of the guide unit at a location adjacent to the outlet portion, whereby it is possible to prevent the hydrogen dissolved in water from decreasing over time.

An embodiment of the present invention is further advantageous in that the hydrogen water generator is placed adjacent to the outer side of the remaining side guide wall to prevent interference with the drive unit placed adjacent to the outer side of one of the side guide walls, whereby it is possible to reduce in size the dispenser unit thereby adding to the convenience of the entire layout and to the compact arrangement thereof.

An embodiment of the present invention is further advantageous in that when the hydraulic pressure reduced below a predetermined level by a pressure reducing portion, it is possible to compensate the hydraulic pressure because the inlet portion of the hydrogen water generator extends downward.

An embodiment of the present invention is further advantageous in that a front part of the dispenser unit corresponding to the hydrogen water generator is made of a transparent material and further the outer surface of the hydrogen water generator is also made of a transparent material, whereby the user can check the generation of hydrogen water in real time to ensure that the operation is satisfactory.

An embodiment of the present invention is further advantageous in that an LED is additionally provided adjacent to the hydrogen water generator allow reading of the amount of hydrogen water even in a dark indoor space, to ensure that the operation is satisfactory. An embodiment of the present invention is further advantageous in that a display portion displays replacement information pertaining to the hydrogen water generator when an amount of hydrogen dissolved in the hydrogen water supplied from the hydrogen water generator is less than or equal to a predetermined value, making it possible to replace the hydrogen water generator rapidly during abnormal operation.

An embodiment of the present invention is further advantageous in that it is possible to use the dispenser unit regardless of the shape of the cup used to receive the water because an outlet portion-insertion hole penetrating through the outlet portion is disposed in front of the hollow portion through which ice is discharged, thereby facilitating user convenience.

An embodiment of the present invention is further advantageous in that a hydrogen water supply path and a normal water supply path are separated such that the residual hydrogen in an outlet portion side is not dissolved in the normal water, whereby it is possible to further ensure user choice between either normal water or hydrogen water.

An embodiment of the present invention is further advantageous in that a normal water outlet portion extends substantially horizontally and then extends downwardly in accordance with a bend thereof, whereby it is possible to minimize the flow path of normal water.

An embodiment of the present invention is further advantageous in that 1) positions of the outlet portion-insertion hole and the normal water hole are adjacent to each other or 2) outer circumferential surfaces thereof are formed to be substantially in linear contact with each other, thereby facilitating user convenience.

Even if not explicitly mentioned here, the effects described in the following specification, which are expected by the technical features of the present invention, and its potential effects are treated as described in the specification of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
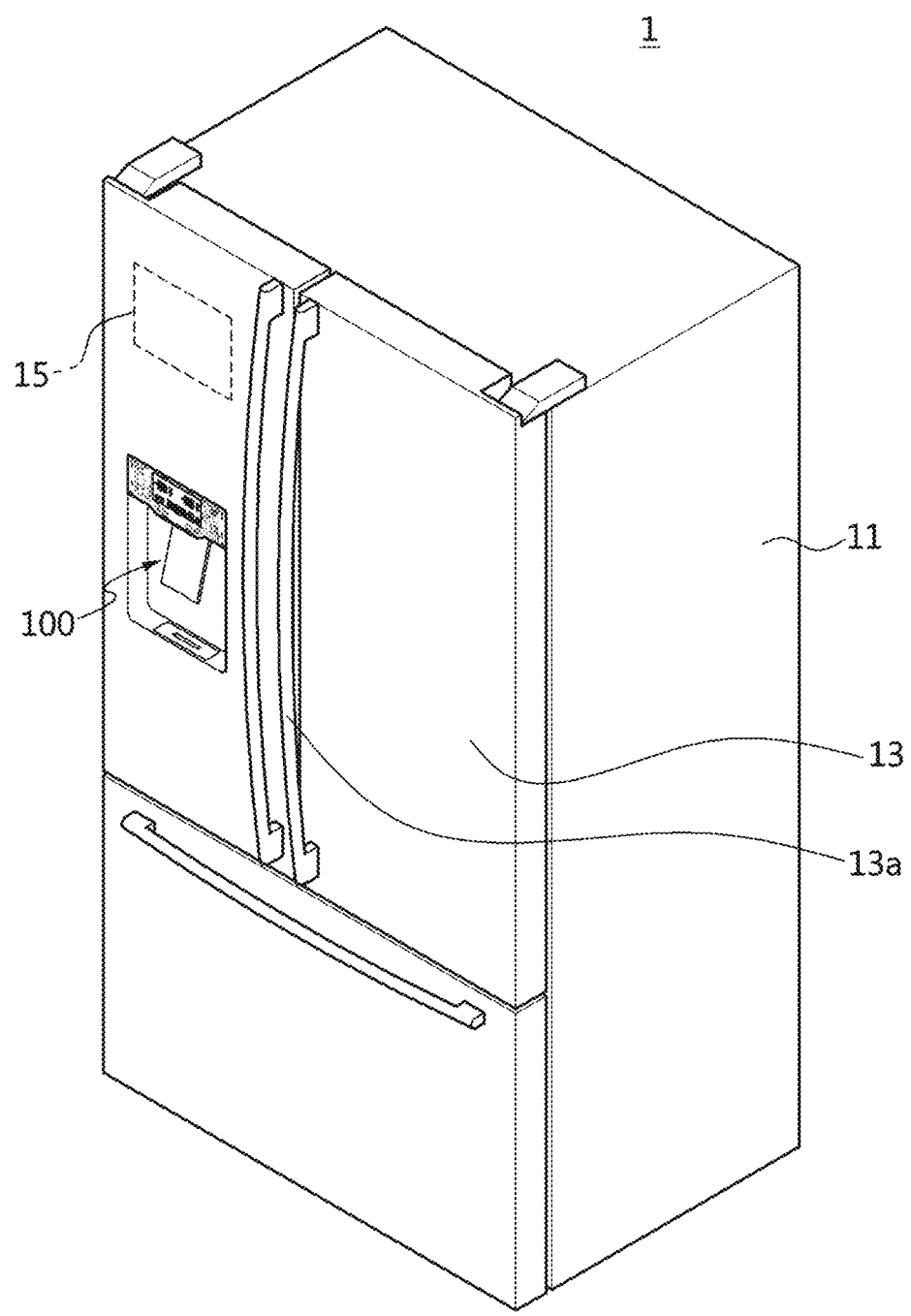
FIG. 1 is a perspective view of a refrigerator according to an embodiment of the present invention.

A preferred embodiment of the present invention will be described in detail with reference to the accompanying drawings. These embodiments will be described in detail in order to allow those skilled in the art to practice the present invention. Wherever possible, the same reference numerals will be used throughout the drawings and the description to refer to the same or like elements or parts. Further, it is to be noted that, when the functions of conventional elements and the detailed description of elements related with the present invention may make the gist of the present invention unclear, a detailed description of those elements will be omitted.

Further, terms such as a first term and a second term may be used for explaining various constitutive elements, but the constitutive elements should not be limited to these terms. These terms are used only for the purpose for distinguishing a constitutive element from other constitutive element. For example, a first constitutive element may be referred as a second constitutive element, and the second constitutive element may be also referred to as the first constitutive element.

Reference will now be made in greater detail to a hydrogen water dispenser unit and a refrigerator including the same according to an embodiment of the present invention with reference to the accompanying drawings.

FIG. 1 is a perspective view of a refrigerator according to an embodiment of the present invention.

Referring to FIG. 1, a refrigerator 1 provided with a hydrogen water dispenser unit according to an embodiment of the present invention and includes: a storage body 11 (which forms the overall appearance of the refrigerator) configured such that an inner space thereof is recessed from the front side to the rear side to form a storage space therein; and an opening and closing unit 13 (e.g., a door or doors) coupled to the storage body 11 to selectively open and close the storage space. Further, opening and closing unit 13 may be, for example, rotatably coupled to the storage body 11, e.g., via hinges.

Further, a handle 13a may be provided on the front surface of the opening and closing unit 13 to allow a user to easily open and close the opening and closing unit 13. The handle 13a may have a predetermined length along the height direction of the refrigerator 1, but is not limited to any particular length. The number of the opening and closing units 13 provided on the front surface of the storage body 11 may be two with one door on the left and one door on the right sides, respectively, but is not limited to any particular number.

Figure 2:
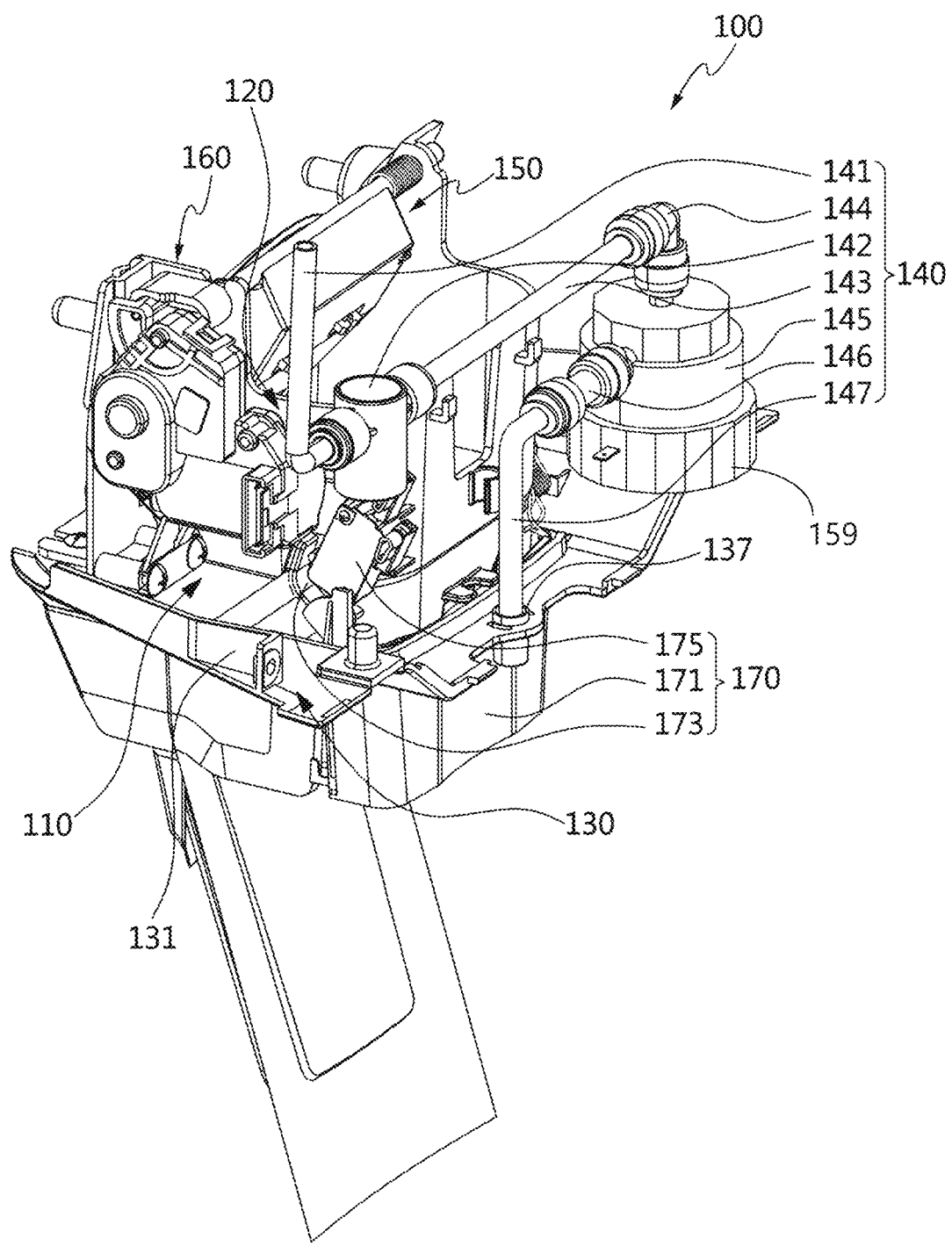
FIG. 2 is a perspective view of a dispenser unit in accordance with an embodiment of the present invention and provided in the refrigerator of FIG. 1.
Figure 3:
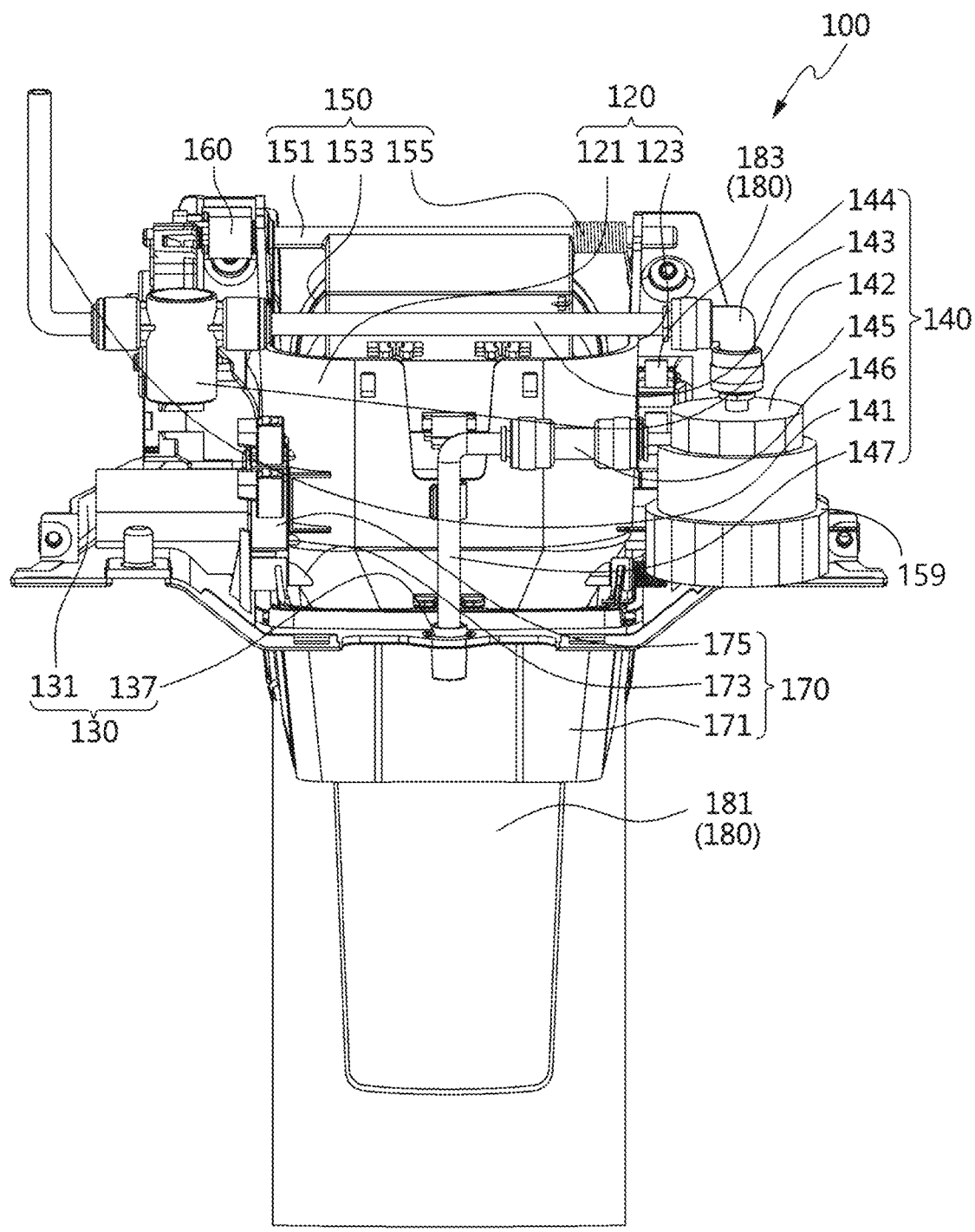
FIG. 3 is a front view of the dispenser unit of FIG. 2.
Figure 4:
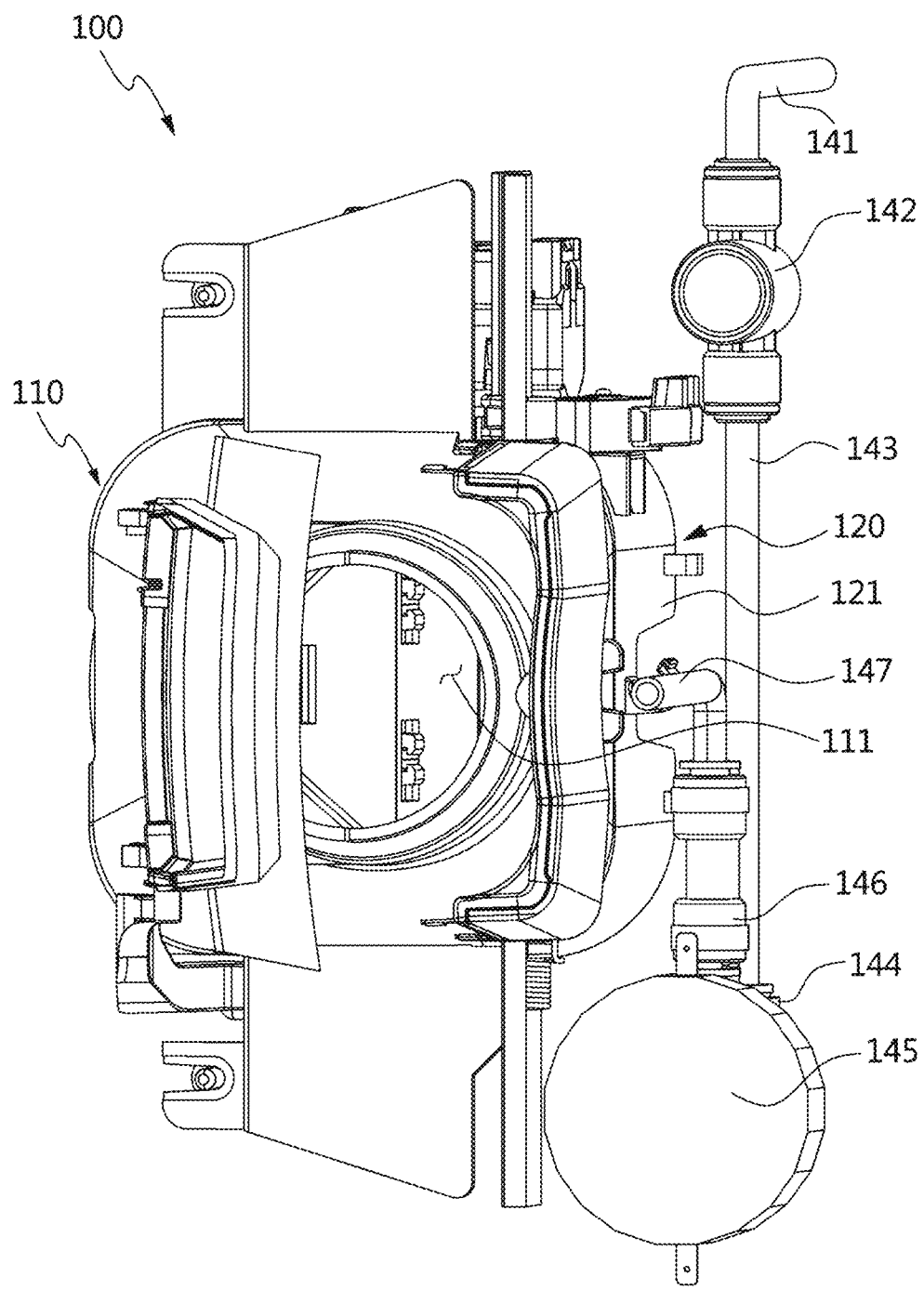
FIG. 4 is a bottom view of the dispenser unit of FIG. 2.
Figure 5:
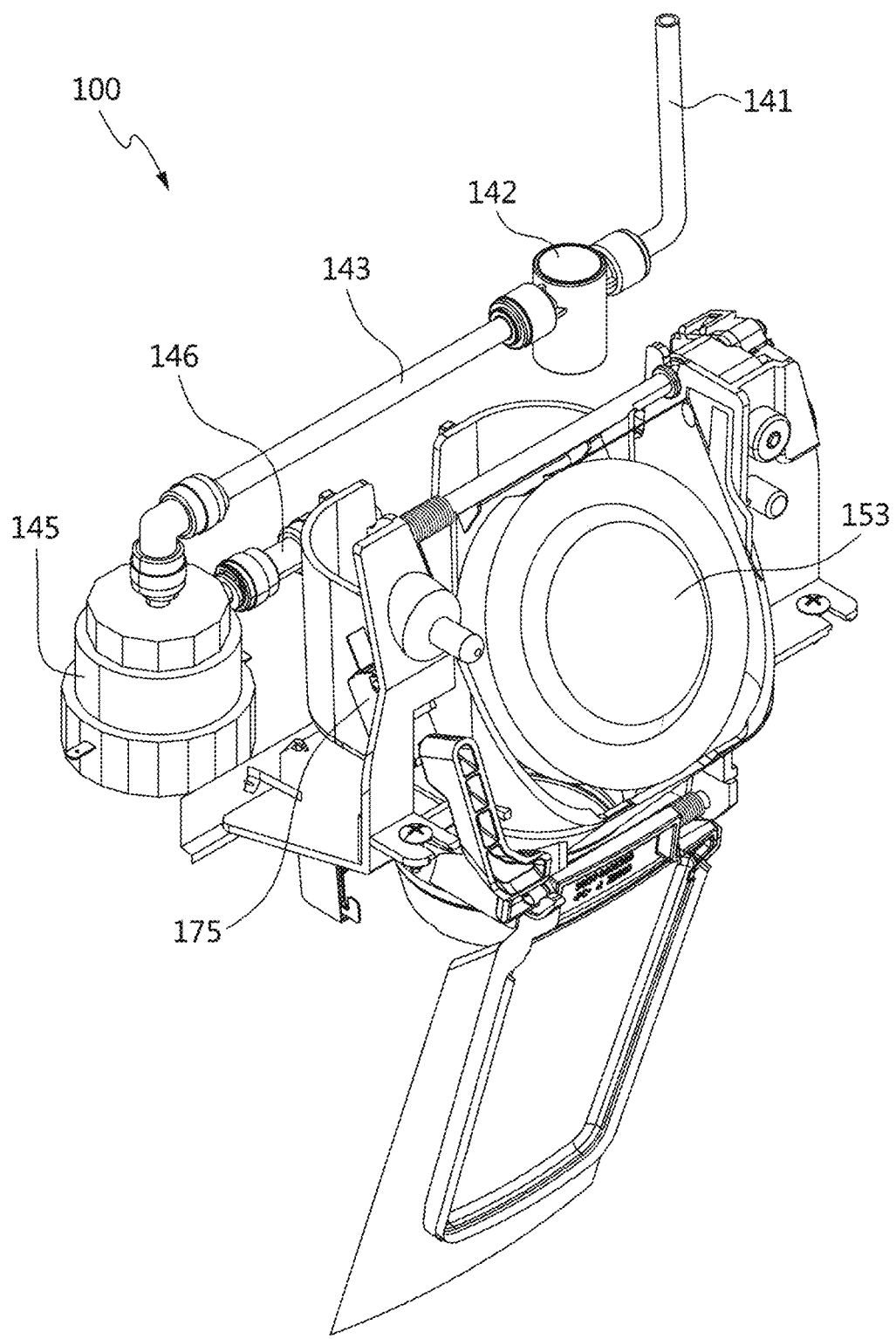
FIG. 5 is a back perspective view of the dispenser unit of FIG. 2.
Figure 6:
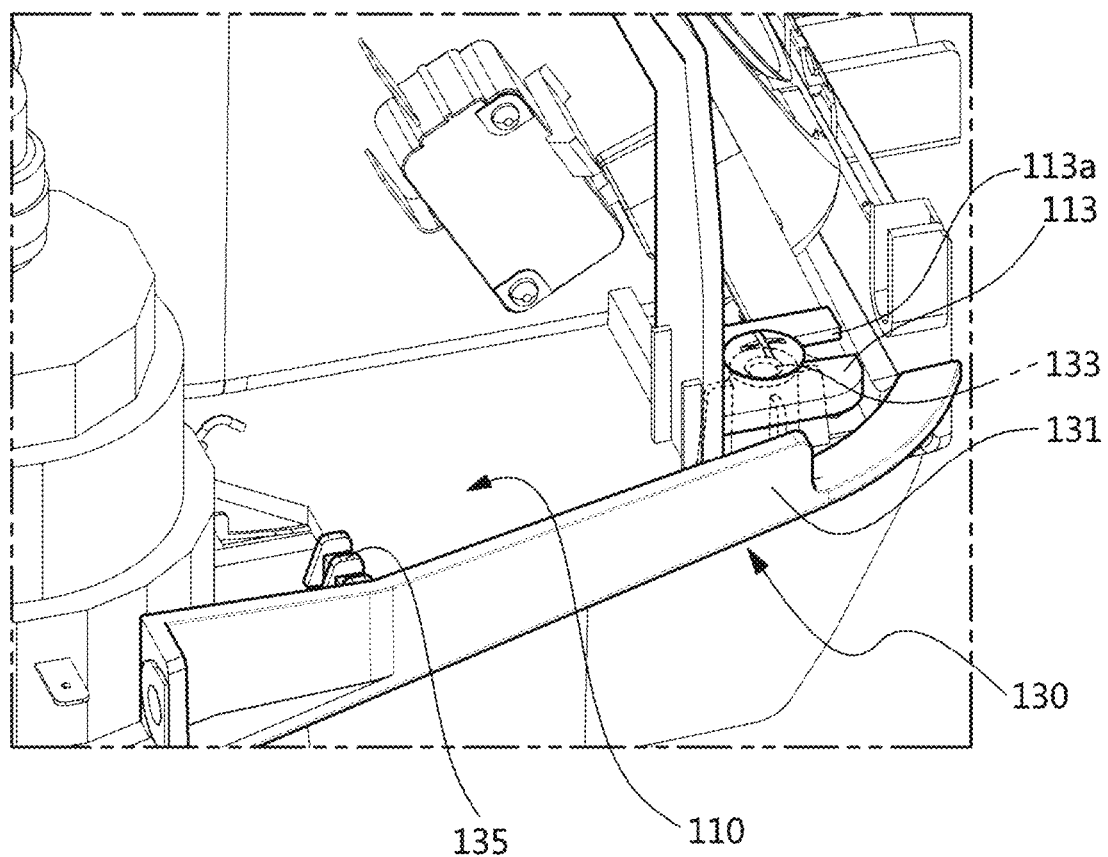
FIG. 6 is a reference view showing how a plate unit and a mount unit are coupled to each other in the dispenser unit of FIG. 2 in accordance with an embodiment of the present invention.
Figure 7A:
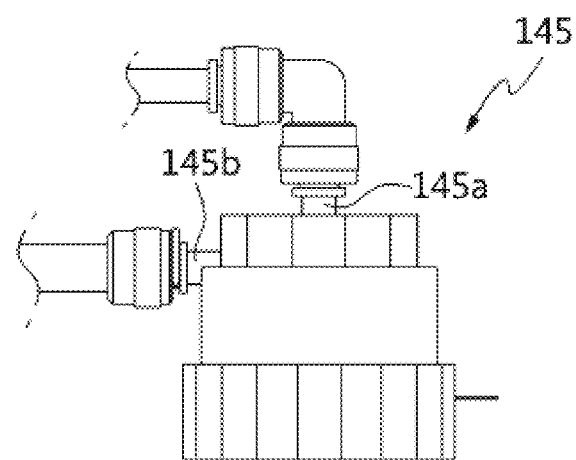
FIGS. 7A and 7B are reference views of a hydrogen water generator in the dispenser unit of FIG. 2 in accordance with an embodiment of the present invention.
Figure 7B:
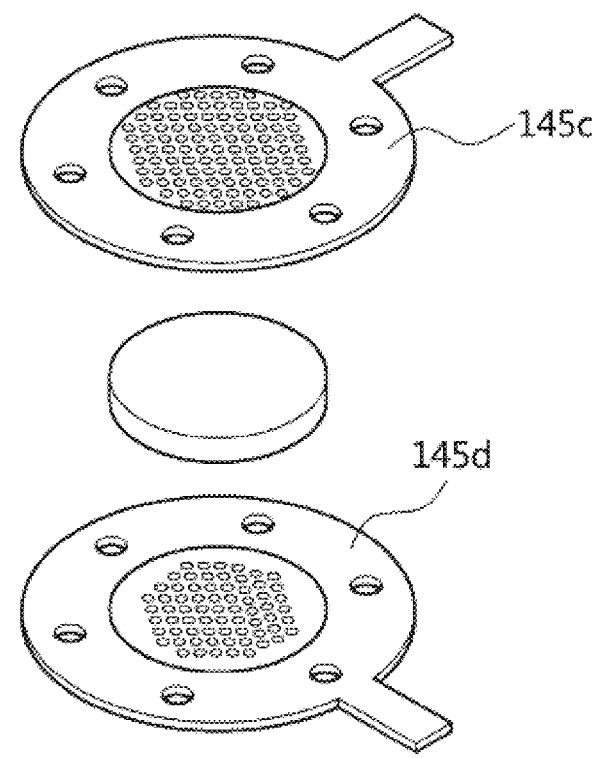
Figure 8:
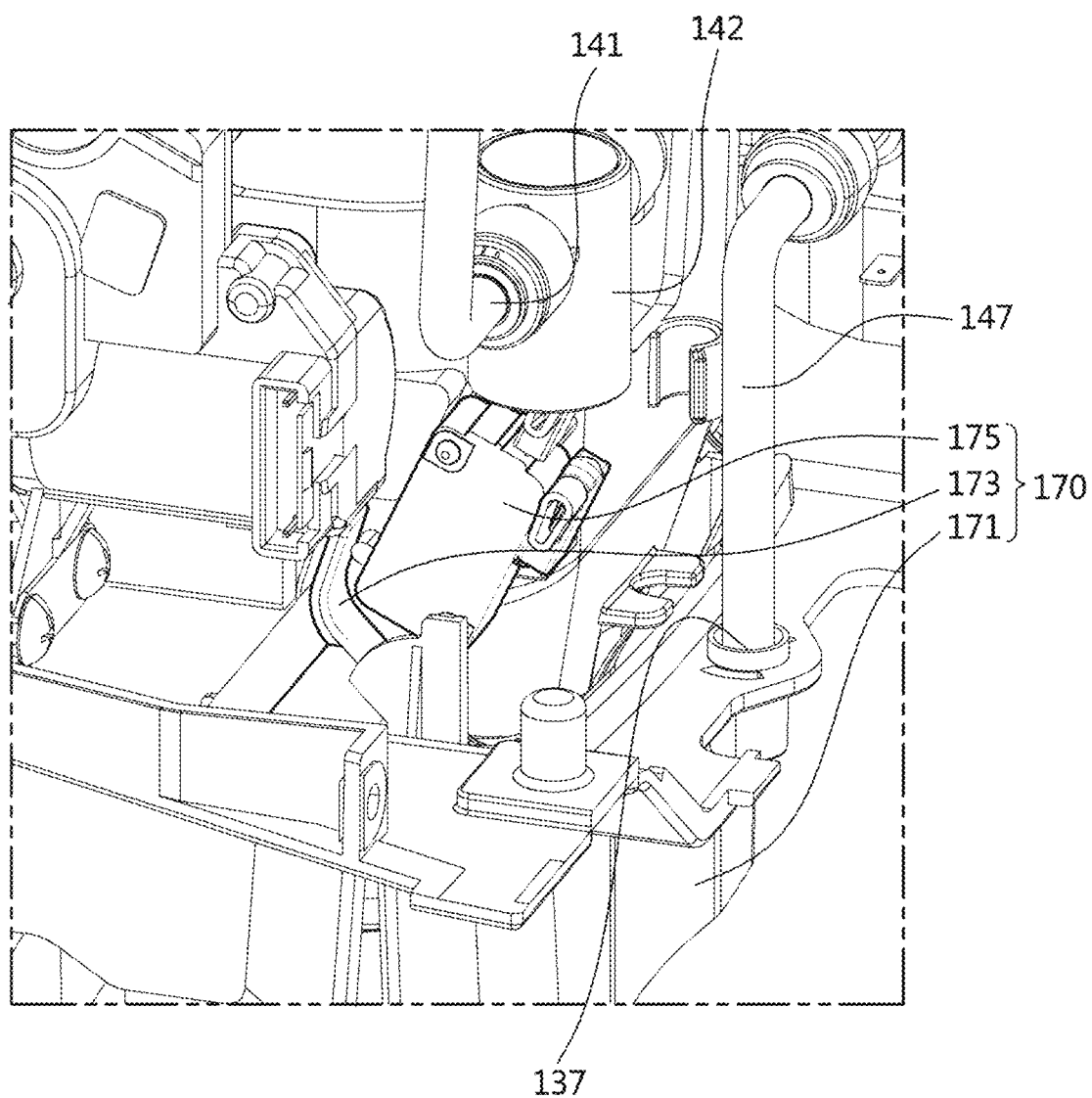
FIG. 8 is a reference view of a water discharge operation unit in the dispenser unit of FIG. 2 in accordance with an embodiment of the present invention.
Figure 9:
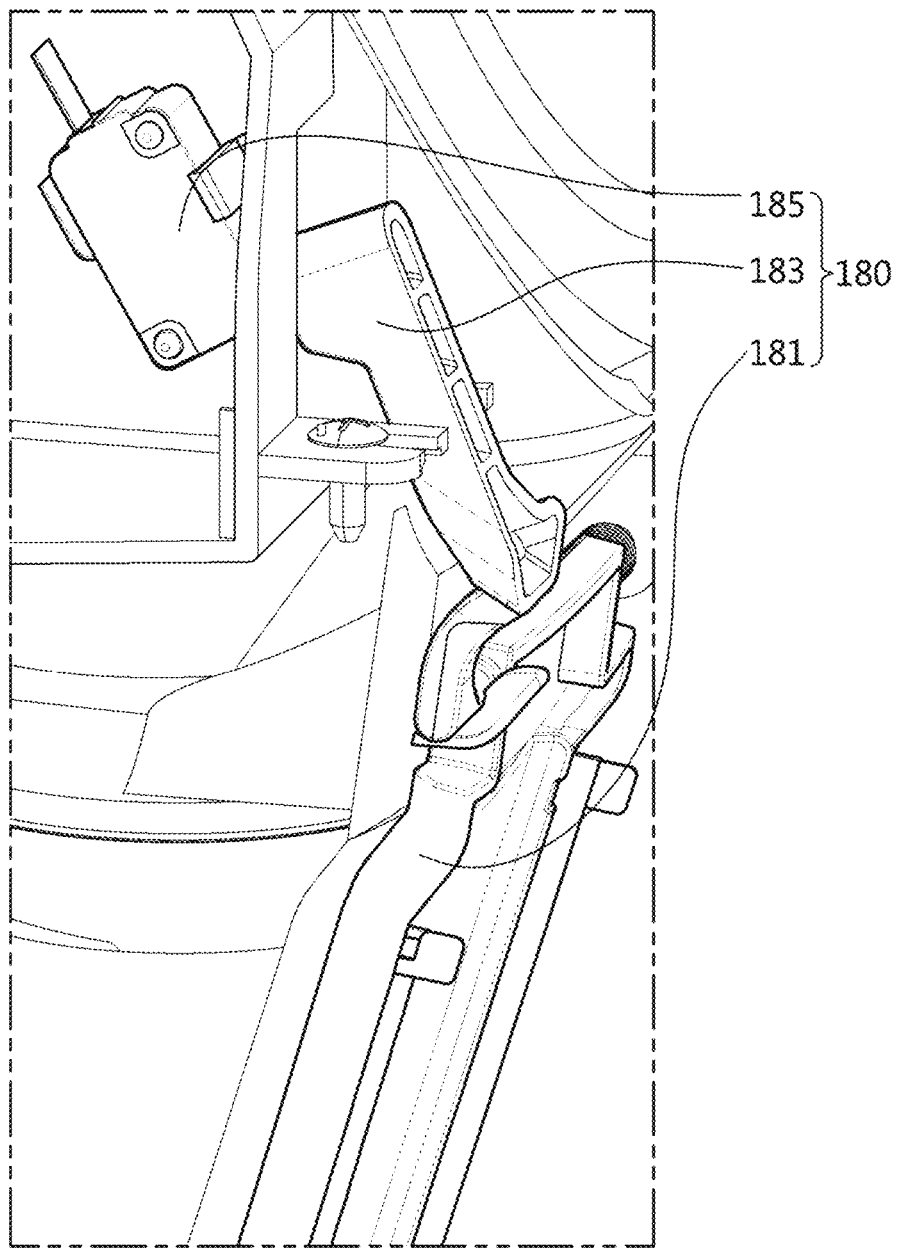
FIG. 9 is a reference view of an ice discharge operation unit in the dispenser unit of FIG. 2 in accordance with an embodiment of the present invention.
Figure 10:
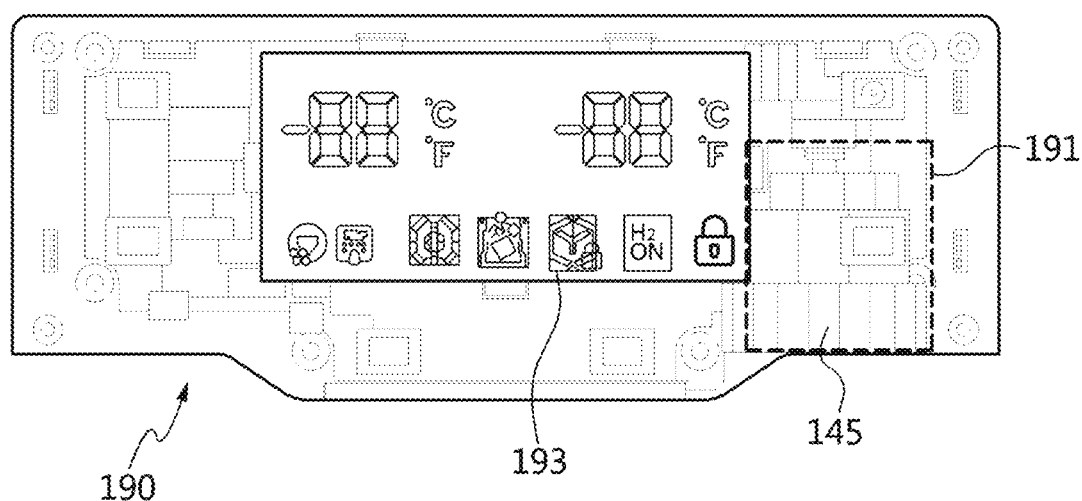
FIG. 10 is a reference view of a check unit in the dispenser unit of FIG. 2 in accordance with an embodiment of the present invention.

FIG. 2 is a perspective view of a dispenser unit provided in the refrigerator of FIG. 1; FIG. 3 is a front view of the dispenser unit of FIG. 2; FIG. 4 is a bottom view of the dispenser unit of FIG. 2; FIG. 5 is a back perspective view of the dispenser unit of FIG. 2; FIG. 6 is a reference view showing how a plate unit and a mount unit are coupled to each other in the dispenser unit of FIG. 2; FIGS. 7A and 7B are reference views of a hydrogen water generator in the dispenser unit of FIG. 2; FIG. 8 is a reference view of a water discharge operation unit in the dispenser unit of FIG. 2; FIG. 9 is a reference view of an ice discharge operation unit in the dispenser unit of FIG. 2; and FIG. 10 is a reference view of a check unit in the dispenser unit of FIG. 2.

Referring to FIGS. 2 to 5, the refrigerator 1 according to the embodiment of the present invention is provided with a dispenser unit 100 on a first side of the refrigerator 1, preferably, on a first side of the opening and closing unit 13. Further, on a second side of the refrigerator 1, preferably, on an inner side of the storage body 11, an ice maker 15 may be provided to supply ice to the user through the dispenser unit 100.

Hereinbelow, reference will be made in detail to the dispenser unit 100 according to an embodiment of the present invention.

Referring to FIGS. 2 to 5, as described above, the dispenser unit 100 is provided on the first side of the refrigerator 1, preferably, on the first side of the opening and closing unit 13, which is configured to dispense water or ice to the user from the refrigerator 1. To this end, the dispenser unit 100 may include a plate unit 110, a guide unit 120, a mount unit 130, a water supply unit 140, an ice cap 150, a rotation drive unit 160, a water discharge operation unit 170, an ice discharge operation unit 180, and a check unit 190.

Referring to FIG. 2, the plate unit 110 is an assembly in which the guide unit 120 is seated. Further, a hollow portion 111 is formed at one side of the plate unit 110 to serve as a passage for ice. For example, the hollow portion 111 may be formed through substantially the center of the plate unit 110. Thus, the ice can be dispensed from the dispenser unit 100 by naturally moving downward.

Further, the plate unit 110 includes a protruding portion 113, preferably, a pair of protruding portions 113 being spaced apart from each other and protruding in one direction in a substantially horizontal direction. The protruding portion 113 is provided with a guide groove 113a that is recessed from a first end to the inside to a predetermined depth to receive a coupling means (see FIG. 6). Herein, the coupling means may be of any of a variety of well known configurations such as a coupling screw and a bolt, etc., but is not limited thereto.

Accordingly, for example, a bolt body inserted into the inner end of the guide groove 113a through the guide groove 113a is inserted into the plate unit 110 and a grooved hole 133 of the mount unit 130 (to be described later), and a bolt head is seated on the upper surface of the guide groove 113a, whereby the plate unit 110 and the mount unit 130 are coupled to each other. Accordingly, it is more preferable that the distance between the inner surfaces of the guide groove 113a is smaller than the diameter of the bolt head.

Referring to FIGS. 3 and 5, the guide unit 120 is formed to extend upward along the upper surface of the plate unit 110. The guide unit 120 may include a front guide surface 121 formed on the front side, and a side guide wall 123 connected to each of opposite side ends of the front guide surface 121 to surround the inner circumferential surface of the hollow portion 111. Accordingly, the guide unit 120 is configured, for example, to surround the hollow portion 111 formed in the plate unit 110, whereby it is possible to prevent ice that is introduced from the upper side into the inner space of the hollow portion 111 from being separated outwardly. Thus, the guide unit 120 can guide the inflow path of ice. Further, the guide unit 120 may be integrally formed with the plate unit 110, or may be separately formed, but there is no particular limitation thereon.

Referring to FIG. 2, the mount unit 130 is configured to be coupled to one side of the refrigerator, and other components of the dispenser unit 100 are mounted thereto. For example, some components of the plate unit 110 and the water supply unit 140 may be mounted thereto. Accordingly, it is preferable that the mount unit 130 is disposed at the lower portion of the plate unit 110.

Further, the mount unit 130 may be formed with an anti-separation wall 131 protruding upward to a predetermined thickness adjacent to opposite side ends thereof. Accordingly, it is possible to prevent lateral separation of the plate unit 110 that is seated inside the anti-separation walls 131.

Further, referring to FIG. 6, the mount unit 130 is formed in the upper surface thereof with a coupling means or grooved hole 133, and preferably, a pair of grooved holes 133. Accordingly, the inner end of the coupling means 113a (guide groove 113a) of the protruding portion 113 of the plate unit 110 positioned at the upper portion of the mount unit 130 is matched to with the position of the coupling means 133 (grooved hole 133), and then the coupling means is passed through the protruding portion 113 to be inserted into the inner space of the coupling means 133 (grooved hole 133). Thereby, the mount unit 130 and the plate unit 110 are coupled to each other. The coupling means (grooved hole) 133 may be formed on the upper surface of the mount unit 130 and adjacent to the rear side.

Further, a locking protrusion 135, preferably, a pair of locking protrusions 135 spaced apart from each other are formed upwardly on the upper surface of the mount unit 130. The locking protrusion 135 has a side cross-section formed in a reverse L shape. The front surface of the plate unit 110 is inserted into the inner space thereof, whereby the front surface of the plate unit 110 is prevented from being separated upward or forward. In summary, for example, after the front surface of the plate unit 110 is inserted into the inner space of the locking protrusion 135, the coupling means (grooved hole) 133 and the coupling means (guide groove) 113a are matched with each other, whereby the rear side of the plate unit 110 can be locked to the mount unit 130 by insertion of coupling means.

Lastly, at a side of the mount unit 130, preferably, at a location of a side of the mount unit adjacent to the front surface, an outlet portion-insertion hole 137 may be formed to allow an outlet portion 147 to pass therethrough, described below. Accordingly, it is possible to flow from the dispenser unit 100 to the outside.

Referring to FIGS. 2 to 4, the water supply unit 140 is an assembly for providing water to the user from the dispenser unit 100, and to achieve this, may include an inlet portion 141, a pressure reducing portion 142, a flow portion 143, a first fitting hose 144, a hydrogen water generator 145, a second fitting hose 146, and the outlet portion 147. Further, the entire assembly of the water supply unit 140 is preferably provided on the front side of the guide unit 120 in order to avoid mutual interference between ice supplied to the inside of the guide unit 120 and to allow the user to easily receive water.

As will be described in detail below, the water supply unit 140 according to an embodiment of the present invention can selectively provide hydrogen water. Accordingly, by supplying hydrogen water, it is possible to remove oxygen free radicals accumulated in the body. As the oxygen introduced into the body during breathing is used in the oxidation process, the oxygen free radicals produced in the metabolic process damage cell structure and cause protein degradation. Thus, in order to remove such oxygen free radicals, hydrogen water is advantageously supplied by the refrigerator appliance 1.

The inlet portion 141 is a conduit assembly for supplying water to the inside of the dispenser unit 100. Looking at the exemplary water supply path of the refrigerator 1, water is delivered into the dispenser unit 100 along the inlet portion 141 from a faucet via a water filter (not shown).

For example, it is preferable that the inlet portion 141 extends through the upper portion of the dispenser unit 100, then extends inside the dispenser unit 100, and then extends by being bent in a substantially horizontal direction. In order to maximize the generation of hydrogen in the electrode body of the hydrogen water generator 145 (to be described later), the water pressure needs to be maintained below a predetermined level before being supplied to the hydrogen water generator 145. Accordingly, it is advantageous to bend the end portion of the inlet portion 141 in the horizontal direction in order to reduce the pressure of the water supplied by flowing it to the dispenser unit 100 in a substantially vertical direction.

As described above, the pressure reducing portion 142 is configured such that a first end thereof is coupled with a first end of the inlet portion 141 in order to maximize the generation of hydrogen in the electrode body by reducing the hydraulic pressure before being supplied to the hydrogen water generator 145. The pressure reducing portion 142 may be, for example, a pressure reducing valve.

The flow portion 143 has a conduit assembly in which a first end thereof extends substantially horizontally from a second end of the pressure reducing portion 142. The flow portion 143 also preferably extends in the substantially horizontal direction to prevent the water pressure as reduced by the pressure reducing portion 142 from rising again.

The first fitting hose 144 is configured such that a first end thereof communicates with a second end of the flow portion 143, and a second end thereof communicates with a supply portion 145a of the hydrogen water generator 145. Further, the first fitting hose 144 is bent in accordance with a reverse L shape such that the flowing water flows downward into the hydrogen water generator 145.

The hydrogen water generator 145 includes an electrode body thereinside, and generates hydrogen by electrolyzing the introduced water within a reservoir 159 and the generated hydrogen is dissolved, thereby generating and supplying hydrogen water. Further, hydrogen water may be selectively dispensed at the preference of the user. For example, when the user presses or touches a hydrogen water button provided on the front surface of the refrigerator 1 or on the front of the dispenser unit 100, a control unit (not shown) operates the hydrogen water generator 145 to turn on to supply the hydrogen-dissolved water to the user. Otherwise, normal water in which the hydrogen is not dissolved is dispensed.

Further, it is preferable that the entire outer surface of the hydrogen water generator 145 is made of a transparent material so that the user can visually check whether hydrogen water is generated or not from outside of the dispenser unit 100. This allows increased ease of use of the refrigerator 1. Further, referring to FIGS. 7A and 7B, the hydrogen water generator 145 may include: the supply portion 145*a* communicating with the second end of the first fitting hose 144 and extending downward to be coupled to the upper surface of the generator 145; and a discharge portion 145*b* configured to discharge the hydrogen water from the generator 145 in the lateral direction by being penetrating through the side surface of the generator 145. Accordingly, the hydraulic pressure reduced by flowing through the flow portion 143 can be compensated to a predetermined level by the supply portion 145*a* extending in the substantially vertical direction. That is, even when the hydraulic pressure is low, the possibility that the amount of dissolved hydrogen is maintained at a predetermined level or more is increased.

The electrode body provided in the hydrogen water generator 145 may be formed with an upper electrode 145*c* and a lower electrode 145*d* having a plurality of pores formed at the center thereof, and each of the electrodes 145*c* and 145*d* may be formed with an electrode terminal on one side thereof. Further, the upper and lower electrodes 145*c* and 145*d* may be damaged during long-term use, and the control unit may measure any damage to the electrodes 145*c* and 145*d* and provide the user with information about for electrode replacement through a display portion 191. For example, electrode damage may be determined by measuring the amount of hydrogen dissolved in hydrogen water.

Further, the hydrogen water generator 145 is preferably provided on the left or right side of the front surface of the guide unit 120 to facilitate size reduction of the dispenser unit 100. When the hydrogen water generator 145 is provided right at the front of a front guide surface 120*a*, this may cause a layout problem may occur because the dispenser unit 100 may be large. Further, it is preferable that the hydrogen water generator 145 is provided at a location adjacent to the outlet portion 147 to minimize the distance from the end of the outlet portion 147 through which the water is discharged, thereby minimizing the flow path of the hydrogen water. Thus, it is possible to prevent the amount of hydrogen dissolved in water from decreasing over time.

More preferably, the hydrogen water generator 145 is provided at a location opposite to the location of the rotation drive unit 160 (to be described later) to reduce the size of the dispenser unit 100.

Referring to FIGS. 2 to 5, the second fitting hose 146 is configured such that a first end thereof communicates with a second end of the discharge portion 145*b*, and a second end thereof communicates with a first end of the outlet portion 147.

The outlet portion 147 is configured to flow the water supplied from the hydrogen water generator 145 to outside of the dispenser unit 100. The outlet portion 147 penetrates through the outlet portion-insertion hole 137. Further, for easy water supply, the outlet portion 147 preferably penetrates through at a location adjacent to the front surface of the mount unit 130. For example, in the case of a user filling a sports drink bottle having a very small inlet, it is difficult to dispense water into that bottle when the outlet portion 147 is provided deep inside from the front of the dispenser unit 100. Further, the outlet portion 147 is provided in front of the hollow portion 111 to facilitate filling such bottles.

Referring to FIGS. 2 to 5, the ice cap 150 is configured to be rotatably coupled to a side of the guide unit 120. The ice cap 150 may include a shaft 151 hinged to the side guide wall 123, and a stopper 153 extending from the shaft 151 to open and close the hollow portion 111. The shaft 151 is rotatably inserted into the insertion holes of the side guide walls 123. Further, the ice cap may further include an elastic member 155 provided on the shaft, preferably, at a location adjacent to the guide hole of the side guide wall 123 in order to provide a restoring force to the ice cap 150. It is appreciated that the elastic member 155 may be any of a variety of well known configurations, such as, for instance, a coil spring and a torsion spring. The elastic member 155 provides a rotational force to return the ice cap 150 to its original position when the ice cap 150 is rotated to one side by the rotation drive unit 160.

Referring to FIGS. 2 and 3, the drive unit 160 is provided at a side of the plate unit 110, and for example, is positioned adjacent to the outer side of the side guide wall 123 to provide a rotational force to the ice cap 150. Further, for overall layout convenience and beneficial size reduction of the dispenser unit 100, it is preferable that the drive unit 160 is placed adjacent to one of the side guide wall 123 and the hydrogen water generator 145 is placed adjacent to a remaining side guide wall 123.

Referring to FIGS. 2 and 8, the water discharge operation unit 170 is configured to supply water to the outside of the dispenser unit 100, more preferably to the outside of the dispenser unit 100 through the outlet portion 147, and to achieve this, the dispenser may include a first pressing portion 171, a first contact protrusion 173, and a first switch 175.

The first pressing portion 171 is disposed below the plate unit 110 and extends downward by a predetermined length so that the first contact protrusion 173, which will be described later, is brought into contact with the first switch 175 when the front surface thereof is pressed. For example, the first pressing portion 171 may include a general pressing lever and may be hinged to the plate unit 110 so that is can rotate toward the plate unit 110. Further, it is more preferable that the first pressing portion 171 is disposed behind the outlet portion 147 adjacent to the outlet portion 147 for convenience of use.

The first contact protrusion 173 is rotatably coupled to the first pressing portion 171 to be brought into contact with the neighboring first switch 175 when the first contact protrusion 173 is rotated by being pressed, preferably, rotated in the same direction as the rotation direction of the first contact protrusion 173.

The first switch 175 is disposed adjacent to the first contact protrusion 173 so that the dispenser unit 100 can discharge water outside of the outlet portion 147 under the control of the control unit when the first contact protrusion 173 is pivotally contacted.

Referring to FIGS. 2 and 9, the ice discharge operation unit 180 is configured to supply ice outside of the dispenser unit 100, more preferably to the outside of the dispenser unit 100 through the hollow portion 111, and to achieve this, may include a second pressing portion 181, a second contact protrusion 183, and a second switch 185.

The second pressing portion 181 is disposed below the plate unit 110 and extends downward by a predetermined length so that the second contact protrusion 183, which will be described later, is brought into contact with the second switch 185 when the front surface thereof is pressed. For example, the second pressing portion 181 may include a general pressing lever and may be hinged to the plate unit 110 to be rotatable toward the plate unit 110. Further, it is more preferable that the second pressing portion 181 is disposed behind the hollow portion 111 and adjacent to the hollow portion 111 for user convenience.

The second contact protrusion 183 is rotatably coupled to the second pressing portion 181 to be brought into contact with the neighboring second switch 185 when the second contact protrusion 183 is rotated in response to being pressed, and preferably, rotated in the same direction as the rotation direction of the second contact protrusion 183.

The second switch 185 is disposed adjacent to the second contact protrusion 183 so that the dispenser unit 100 can discharge water below the hollow portion 111 under the control of the control unit when the second contact protrusion 183 is pivotally contacted.

Referring to FIG. 10, the check unit 190 is configured to allow the user to determine whether hydrogen is dissolved in the water that is discharged by the water supply unit 140 and visually check the generation of hydrogen water. To achieve this, the check unit 190 may include the display portion 191, and a hydrogen water generation controller 193.

The display portion 191 is configured such that a transparent window is placed at a portion of the front side of the dispenser unit 100, more preferably, at a location corresponding to the hydrogen water generator 145, whereby the user can visually check the hydrogen water generator 145 from a position outside the dispenser unit 100. Accordingly, both the hydrogen water generator 145 and the display portion 191 are made of a transparent material so that it is possible to check in real time that hydrogen is dissolved in water inside the hydrogen water generator 145.

In addition, a lighting unit (not shown) may be additionally provided at one side of the dispenser unit 100 to allow visualization of hydrogen production in the dark. For example, the lighting unit may be an LED lighting device. Further, it is more preferable that the lighting unit is disposed adjacent to the hydrogen water generator 145. Therefore, at any time, the user can check the generation of hydrogen water in real time, for verification of normal operation.

The hydrogen water generation controller 193 is disposed on the front side of the refrigerator 1 or the dispenser unit 100, preferably on the front side of the display portion 191, so that the user can control the operation of the hydrogen water generator 145. For example, the hydrogen water generation controller 193 may be operated by a button or touch input method, such that the user is able to select whether to receive hydrogen water or normal water from the dispenser.

Hereinbelow, reference will be made in detail to a hydrogen water dispenser unit and a refrigerator including the same according to another embodiment of the present invention with reference to the accompanying drawings. It should be noted that the hydrogen water dispenser unit and the refrigerator according to another embodiment are the same as the hydrogen water dispenser unit and the refrigerator according to the above-described embodiment, and there are only additional configurations pertaining to a water supply unit 140'.

Figure 11:
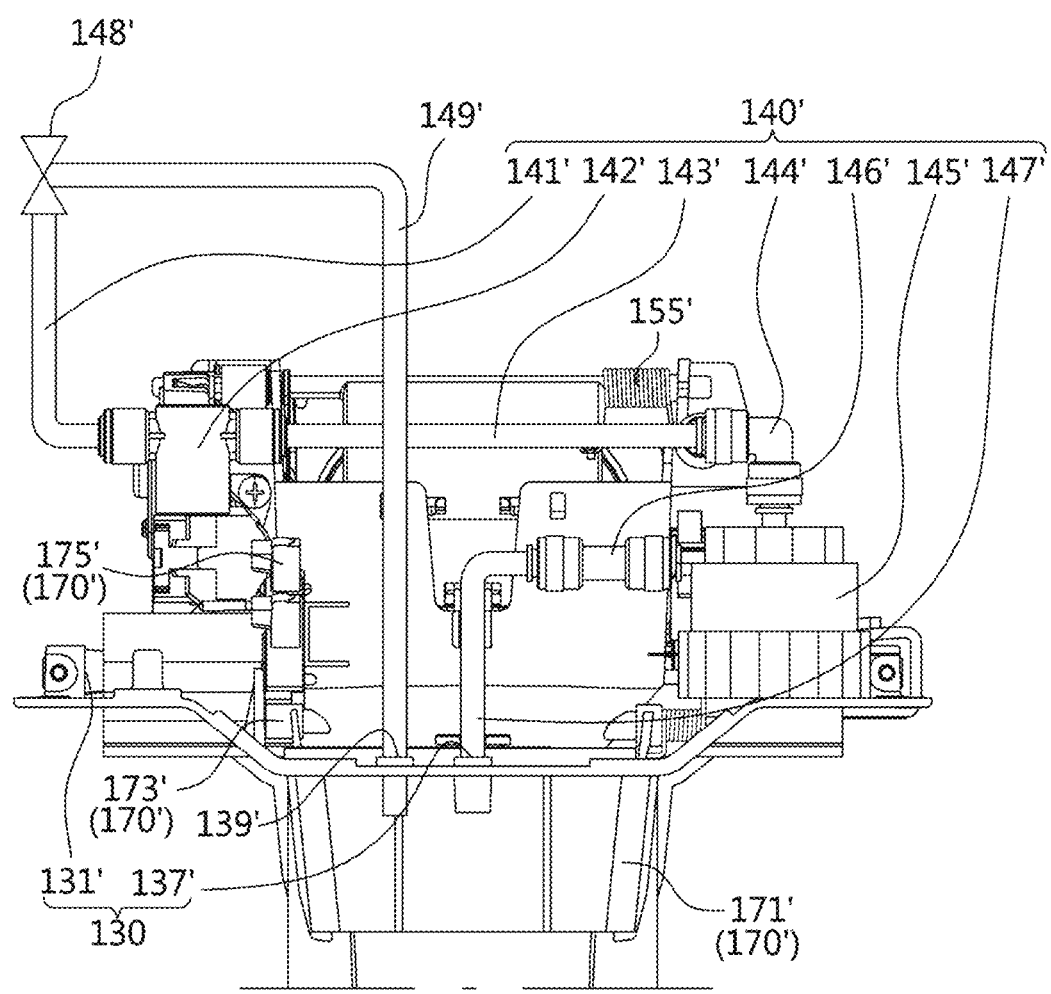
FIG. 11 is a reference view of a dispenser unit provided in a refrigerator according to another embodiment of the present invention.

Referring to FIG. 11, a hydrogen water dispenser unit 100' according to another embodiment of the present invention is configured such that a hydrogen water supply path and a normal water supply path are separated from each other. Accordingly, when normal water is discharged, it is possible to discharge water more rapidly since it is not required to pass through a pressure reducing portion 142', a flow portion 143', a hydrogen water generator 145', and the like. Further, since residual hydrogen in an outlet portion 147' side is not dissolved in the normal water, the user can be assured that a selection of normal water will result in only normal water being dispensed and a selection of hydrogen water dispenses only hydrogen water. Further, the outlet portion 147 according to the first embodiment is understood as the first outlet portion 147'.

Firstly, a two-way valve 148' is provided at a side end of an inlet portion 141' disposed outside the dispenser unit 100'. In other words, through the two-way valve 148', the inlet portion 141' is disposed at the lower portion. Accordingly, after a control signal is received from a hydrogen water generation controller 193' that is configured to control the operation of the hydrogen water generator 145' in response to a button or touch input (located on one side of the front surface of the refrigerator 1' or the dispenser unit 100'), the two-way valve 148' selectively opens and closes the inlet portion 141' and second outlet portion 149'.

Further, the second outlet portion 149 extends substantially horizontally and then extends downwardly in accordance with a bend thereof. Accordingly, it is possible to minimize the flow path of normal water.

The lower end of the second outlet portion 149' penetrates through a through-hole 139' of a mount unit 130' and extends below the dispenser unit 100'. Further, in order to facilitate user convenience, it is preferable that the through-hole 139' is formed at a location adjacent to the outlet portion-insertion hole 137', and it is more preferable that a part of the outer circumferential surface thereof is formed to be substantially in linear contact with the outlet portion-insertion hole 137'.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. It is thus well known to those skilled in that art that the present invention is not limited to the embodiment disclosed in the detailed description, and the patent right of the present invention should be defined by the scope and spirit of the invention as disclosed in the accompanying claims. Accordingly, it should be understood that the present invention includes various modifications, additions and substitutions without departing from the scope and spirit of the invention as disclosed in the accompanying claims.

What is claimed is:

1. A hydrogen water dispenser unit comprising:
a reservoir;
a plate unit comprising a hollow portion thereof;
a guide unit extending upward along an upper surface of the plate unit, and comprising: a front guide surface; and side guide walls respectively connected to opposite side ends of the front guide surface, wherein the side guide walls surround the hollow portion; and
a water supply unit comprising: an inlet portion configured to supply introduced water to the reservoir of the dispenser unit; a hydrogen water generator comprising an electrode body therein and configured to electrolyze the introduced water to generate hydrogen therefrom, and further configured to generate hydrogen water by dissolving the hydrogen generated in the introduced water; and an outlet portion configured to dispense water supplied from the hydrogen water generator, wherein the water supply unit further comprises a pressure reducer disposed between the inlet portion and the hydrogen water generator, wherein the pressure reducer is configured to reduce hydraulic pressure of the introduced water supplied from the inlet portion to the hydrogen water generator.

2. The dispenser unit of claim 1, further comprising: a front surface; and a check unit comprising a hydrogen water generation controller disposed at a side of the dispenser unit, wherein the check unit is configured to control operation of the hydrogen water generator responsive to one of: a button input; and a touch input from a user.

3. The dispenser unit of claim 1, wherein the hydrogen water generator is disposed at a side of the guide unit and adjacent to the outlet portion.

4. The dispenser unit of claim 1, further comprising:
an ice cap rotatably coupled to the guide unit to selectively open and close the hollow portion; and
a drive unit disposed adjacent to an outer side surface of one side guide wall of the side guide walls and configured to exert a rotational force to the ice cap,
wherein the hydrogen water generator is disposed adjacent to an outer side surface of a remaining side guide wall of the side guide walls.

5. The dispenser unit of claim 1, wherein the hydrogen water generator comprises:
a supply portion extending downward and penetrating through an upper surface of the hydrogen water generator wherein the introduced water flows; and
a discharge portion formed through a side surface of the hydrogen water generator.

6. The dispenser unit of claim 5, wherein the water supply unit further comprises a flow portion having a first end that extends horizontally from a second end of the pressure reducer, wherein the introduced water flows to the inlet portion therein.

7. The dispenser unit of claim 1, further comprising a check unit comprising a display comprising a transparent material, and
wherein further an outer surface of the hydrogen water generator is made of a transparent material.

8. The dispenser unit of claim 7, further comprising a lighting unit comprising an LED lighting device and wherein the lighting unit is disposed adjacent to the hydrogen water generator.

9. The dispenser unit of claim 7, wherein the display is operable to display replacement information pertaining to the hydrogen water generator when an amount of hydrogen dissolved in the hydrogen water supplied from the hydrogen water generator is less than or equal to a predetermined value.

10. The dispenser unit of claim 1, further comprising a mount unit having an outlet portion-insertion hole operable to allow the outlet portion to be inserted therethrough, and
wherein the outlet portion-insertion hole is disposed in front of the hollow portion.

11. A hydrogen water dispenser unit comprising:
a plate unit comprising a hollow portion configured as a path for ice;
a guide unit extending upward along an upper surface of the plate unit, and comprising: a front guide surface; and side guide walls respectively connected to opposite side ends of the front guide surface to surround the hollow portion; and
a water supply unit comprising:
a hydrogen water generator configured to discharge hydrogen water outside of the dispenser unit, and comprising an electrode body therein to electrolyze introduced water to generate hydrogen therefrom;
an inlet portion configured to supply the introduced water inside the dispenser unit;
a first outlet portion configured to dispense the hydrogen water discharged from the hydrogen water generator;
a two-way valve disposed at a side end of the inlet portion disposed at an outside of the dispenser unit; and
a second outlet portion configured wherein normal water flows in a lateral direction of the two-way valve.

12. The dispenser unit of claim 11, wherein the second outlet portion extends in the lateral direction of the two-way valve and also extends downward in accordance with a bend thereof.

13. The dispenser unit of claim 12, further comprising a first surface; and a mount unit, wherein the mount unit comprises:
an outlet portion-insertion hole configured to allow the first outlet portion to be inserted therethrough at a location adjacent to the first surface of the dispenser unit; and
a through-hole configured to allow the second outlet portion to be inserted therethrough,
wherein the outlet portion-insertion hole and the through-hole are disposed at a mutually adjacent position.

14. The dispenser unit of claim 12, further comprising a first surface; and a mount unit, wherein the mount unit comprises:
an outlet portion-insertion hole configured to allow the first outlet portion to be inserted there through at a location adjacent to the first surface of the dispenser unit; and
a through-hole configured to allow the second outlet portion to be inserted there through,
wherein the outlet portion-insertion hole and the through-hole are disposed at a position where a part of an outer circumferential surface of the outlet portion-insertion hole is in linear contact with a part of an outer circumferential surface of the through-hole.

15. The dispenser unit of claim 11, wherein the hydrogen water generator is disposed at a side of the guide unit and is adjacent to the first outlet portion.

16. The dispenser unit of claim 11, further comprising a check unit comprising a hydrogen water generation controller disposed at a side of the dispenser unit and configured to control operation of the hydrogen water generator responsive to a user input to a user input device,
wherein the two-way valve selectively opens and closes inlets of the inlet portion and the second outlet portion according to an operation signal from the hydrogen water generation controller.

* * * * *